I. R. ARMSTRONG.
Blinders for Horses.
No. 213,800. Patented April 1, 1879.
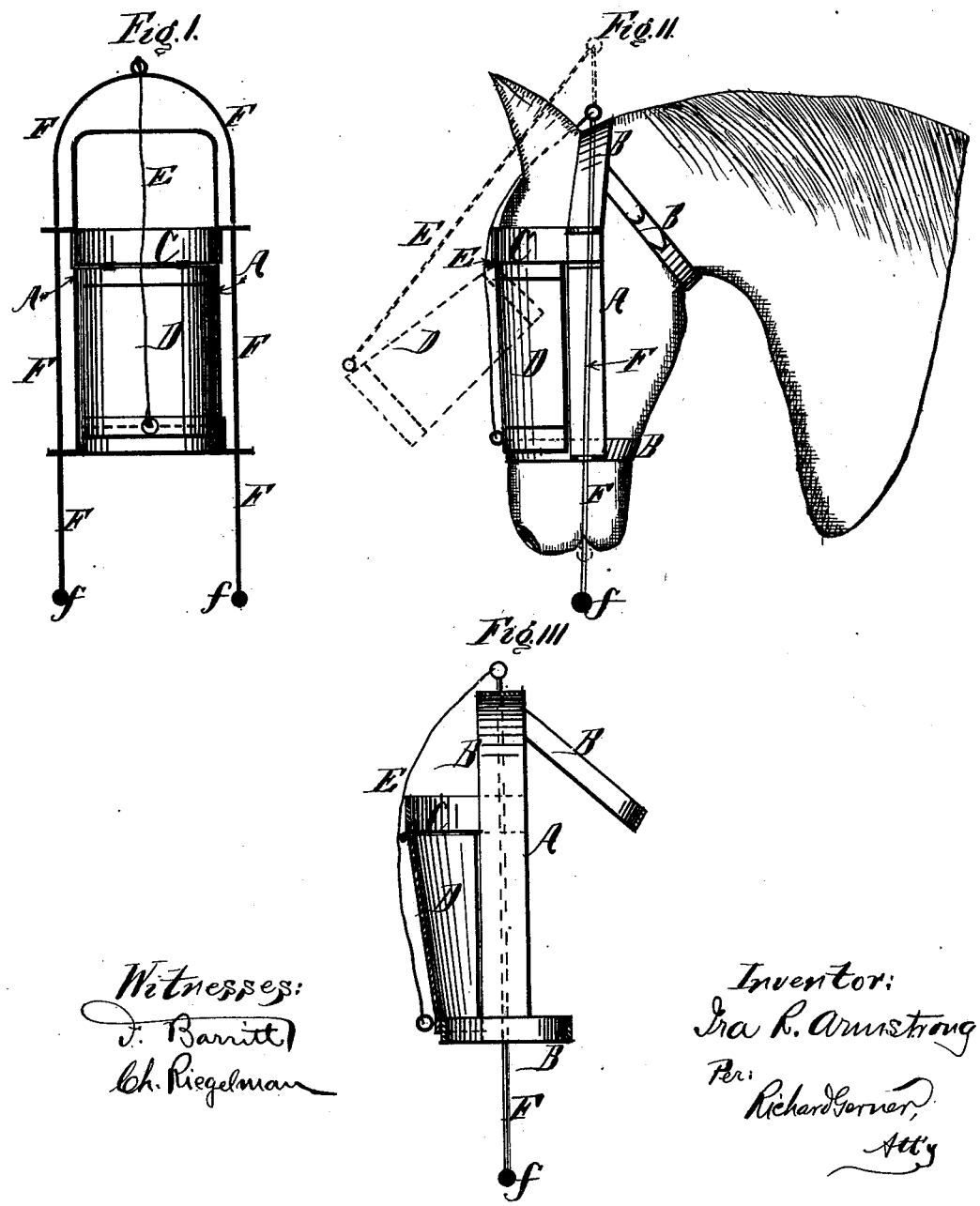

UNITED STATES PATENT OFFICE.

IRA R. ARMSTRONG, OF FLETCHER, VERMONT.

IMPROVEMENT IN BLINDERS FOR HORSES.

Specification forming part of Letters Patent No. 213,800, dated April 1, 1879; application filed August 24, 1878.

*To all whom it may concern:*

Be it known that I, IRA R. ARMSTRONG, of Fletcher, in the county of Franklin, State of Vermont, have invented a new and useful Improvement in an Automatic Blinder for Horses and Cattle; and I do hereby declare that the following is a clear and exact description of my invention, reference being had to the accompanying drawings, forming a part of this specification.

The object of my invention is to provide for an automatic blinder for horses and cattle, which is so constructed that when the animal is nipping the grass the blinder will automatically be lifted, so as to enable the animal to see; but when the head of the animal is raised the blinder will drop down by its own weight, and thus prevent the animal from jumping fences and doing other mischievous acts.

My invention consists of two side plates, which are placed on each side of the head of the animal, and held thereto by suitable straps. To the front of these plates is hinged, on a stationary cross-piece, the blinder, which is connected by a rod, chains, or ropes with sliding rods placed on the outside of the plates, and held in place by aid of lugs. The lower ends of these rods are provided with knobs, to enable the ends of the same to slide easily over the ground.

In order to describe my invention more fully I refer to the drawings, of which—

Figure 1 is a front view of my improved blinder for horses and cattle. Fig. 2 is a side view. Fig. 3 is a sectional view.

A A are two plates, placed one on each side of the animal's head, and held thereto by the straps B B B.

C is a stationary cross-piece, to which is hinged the blinder D. This blinder should be so hinged as to come directly in front of and over the eyes of the animal.

E E are rods or chains connecting the blinder with the arched part of the rods F F, which are placed on the outside of the plates A A and held thereto by lugs, which are provided with holes, through which the said rods F F pass and move vertically. These rods extend a little distance below the mouth of the animal, and are provided at their lower ends with knobs $f\ f$, in order to enable them to slide smoothly over the ground.

When my blinder and its attachments are fastened to an animal's head the blinder D will, by its own weight, drop down over the eyes of the same, as shown in Fig. 1, and will remain in this position as long as the head is raised; but when the animal lowers his head to eat, the rods F F are pushed up until the mouth of the animal touches the grass, which movement raises the blinder D sufficiently to enable the animal to see what he is eating.

Having thus described my invention, I claim—

The rods F F, with knobs $f\ f$, in combination with the hinged blinder D, rods or chains E, plates A, with cross-piece C, and straps B B B, substantially as and for the purpose set forth.

IRA R. ARMSTRONG.

Witnesses:
 REUBEN ARMSTRONG,
 C. F. ARMSTRONG.